May 28, 1935.  N. D. LEVIN ET AL  2,002,951
LOADING MACHINE CONTROL MECHANISM
Filed May 8, 1930  5 Sheets-Sheet 2
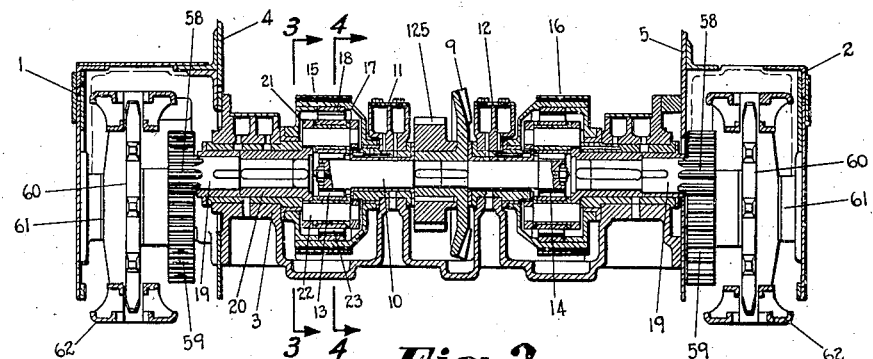
Fig. 2.
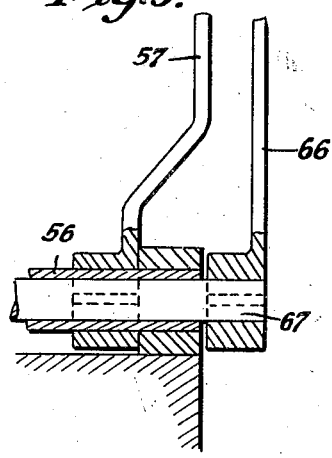
Fig. 3ª.
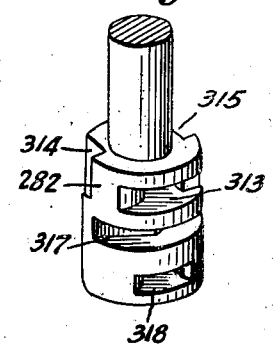
Fig. 11.
Inventors
Nils D. Levin
Edward G. Lewis
Attorneys

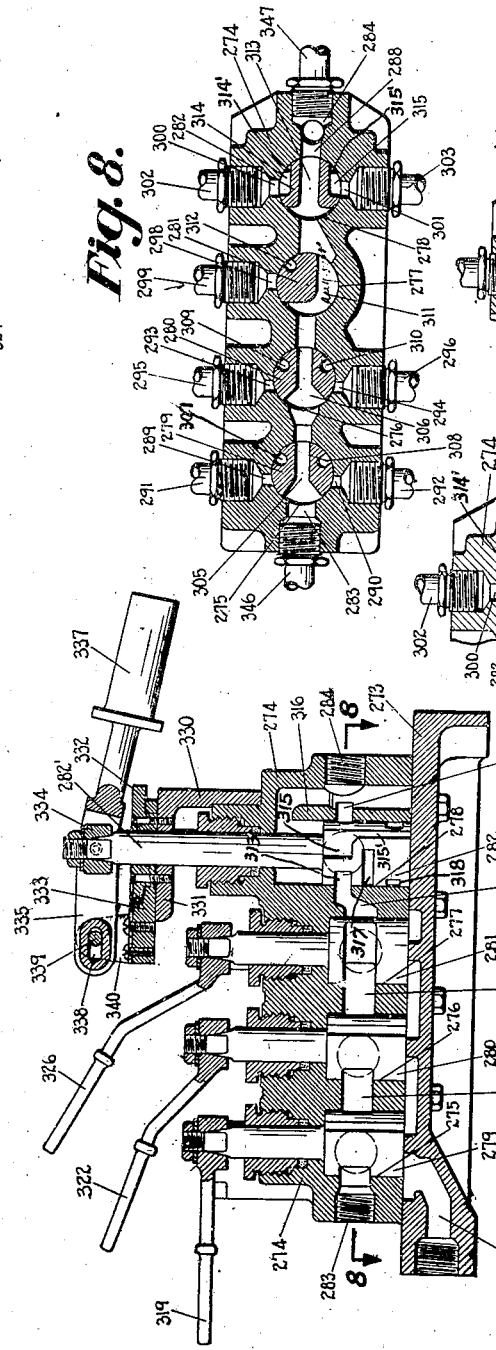

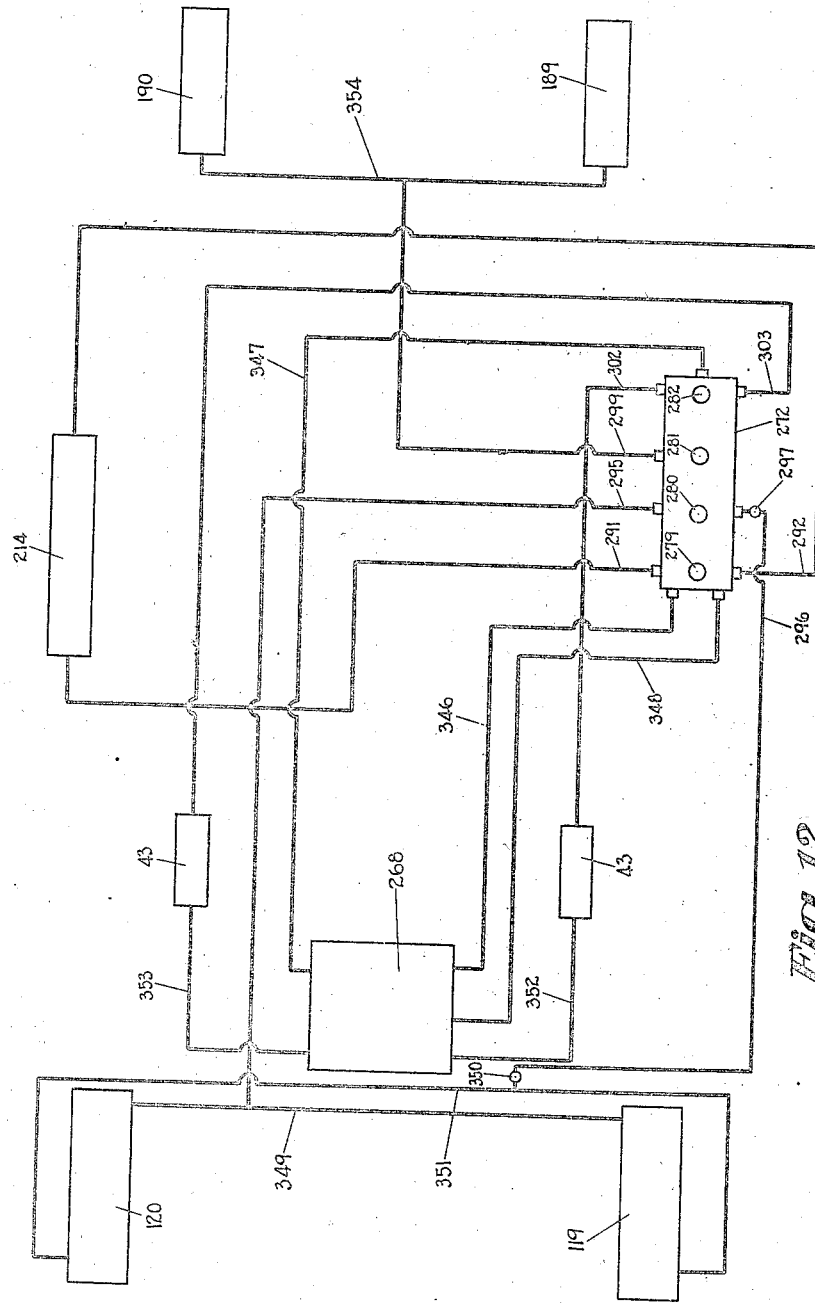

Patented May 28, 1935

2,002,951

UNITED STATES PATENT OFFICE 2,002,951

LOADING MACHINE CONTROL MECHANISM

Nils D. Levin and Edward G. Lewis, Columbus, Ohio, assignors to The Jeffrey Manufacturing Company, Columbus, Ohio, a corporation of Ohio Application May 8, 1930, Serial No. 450,741

18 Claims. (Cl. 180—9.2)

The present invention relates to a hydraulic control system herein conceived of as applied to a loading machine embodying a motive support in the form of a tractor of the endless tread type. Since the loading mechanism per se forms no part of the present invention only the hydraulic system is shown and of this system the invention relates particularly to that part having to do with the steering of the tractor.

The tractor drive is effected through a pair of differential mechanisms, specifically planetary gearings, which include control bands simultaneously and equally or differentially tensionable to control the direction of travel of the tractor. The tensioning of the bands is effected by cylinder and piston units which are in connection with a source of fluid under pressure through a control valve forming a principal subject of the invention. The invention also includes manually operable means, in addition to the hydraulically operated means, for tensioning the bands.

Figure 1:
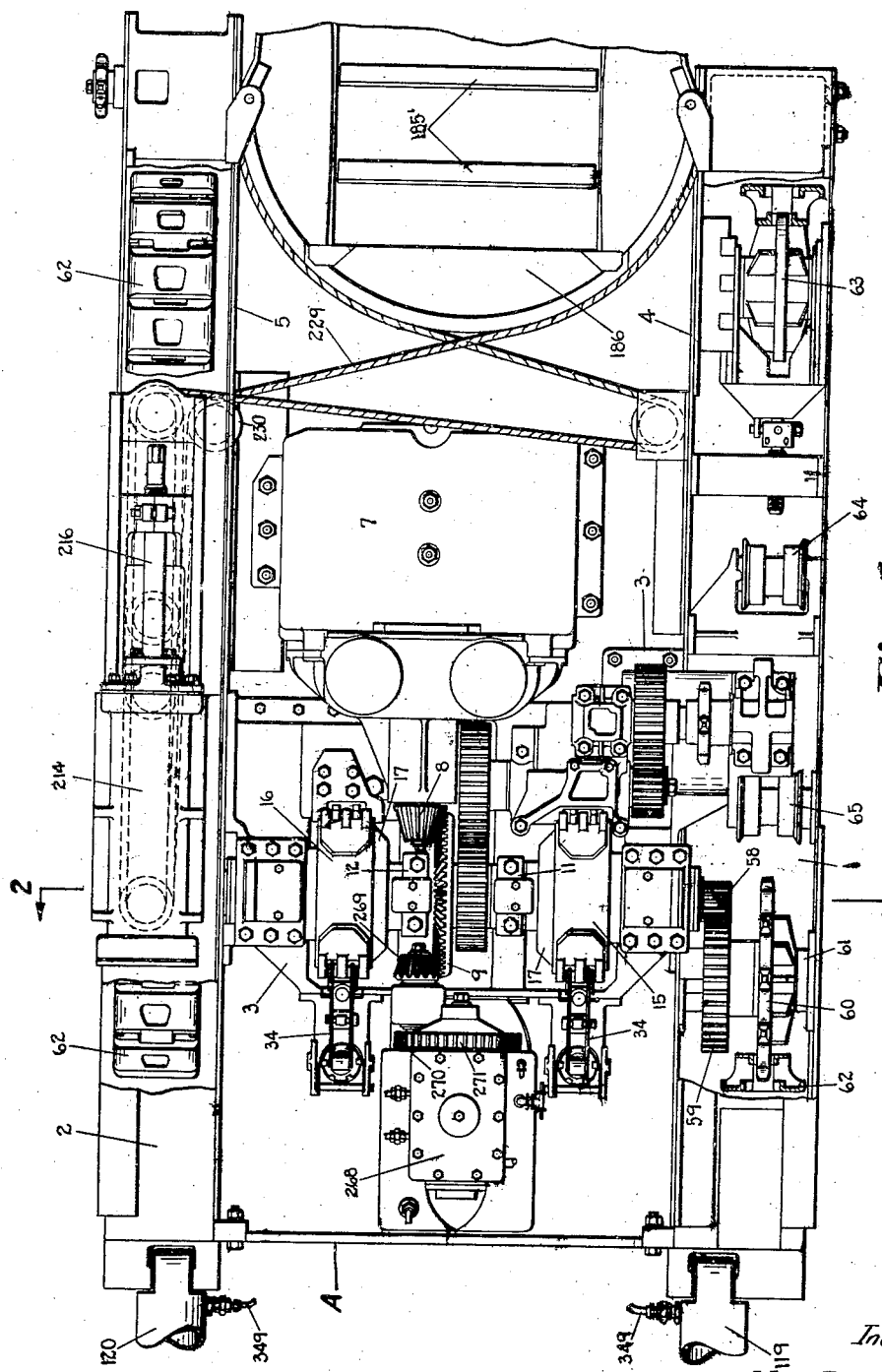
Figure 3:
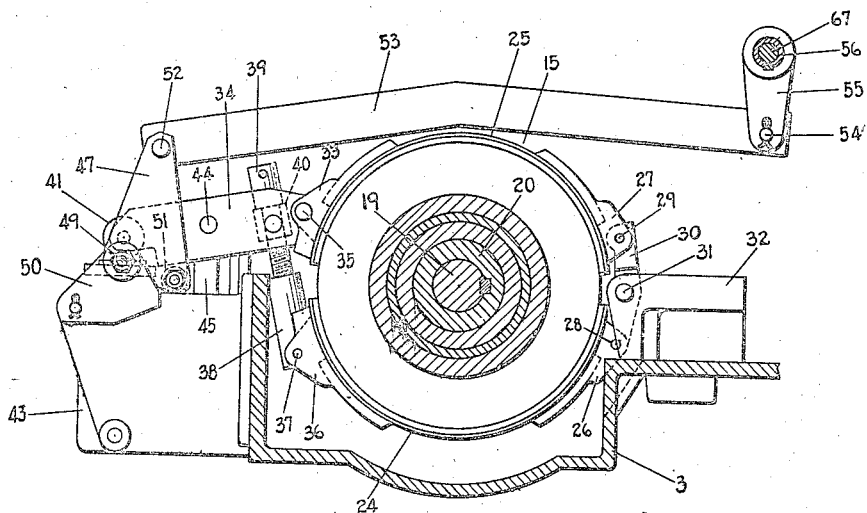
Figure 4:
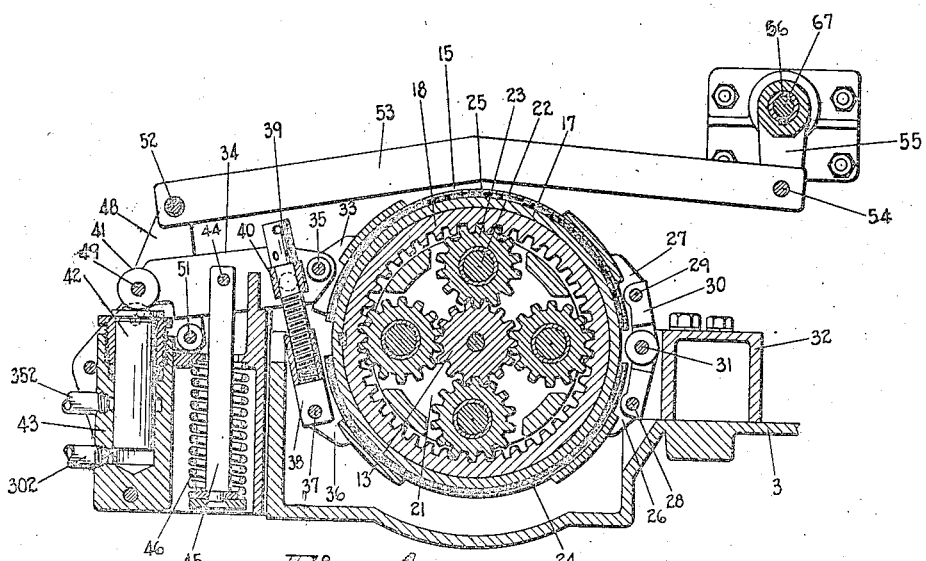

An embodiment of the invention is shown by way of example, in the accompanying drawings, in which Fig. 1 is a plan view of the tractor with parts removed and other parts broken away, Fig. 2 is a section on line 2—2 of Fig. 1, Fig. 3 is a section on line 3—3 of Fig. 2, Fig. 3a shows a detail in section, Fig. 4 is a section on line 4—4 of Fig. 2, Fig. 5 is a plan view of valve mechanism for controlling the flow and distribution of the hydraulic medium, Fig. 6 is an end elevation of the mechanism of Fig. 5, Fig. 7 is a section on line 7—7 of Fig. 5, Fig. 8 is a section on line 8—8 of Fig. 7, Fig. 9 is a partial section on line 8—8 of Fig. 7 with the parts in different relative position, Fig. 10 is a partial section on line 8—8 of Fig. 7 with the parts in still another relative position, Fig. 11 shows in perspective a plug forming part of the control valve, and Fig. 12 is a diagram of the entire hydraulic system.

Referring to the drawings, the tractor or loading machine chassis is designated as a whole, Fig. 1, by the reference character A, and includes a pair of box-like parallel side members 1 and 2 interconnected below their upper extremities by means of a substantially horizontal frame casting 3. Parallel plates 4 and 5 secured to the upper inner margins of members 1 and 2 define a channel adapted to receive a main conveyor frame, not shown.

A motor 7, Figure 1, is arranged on casting 3 with its armature shaft in parallel relation to elements 1 and 2. An armature pinion 8 engages a bevelled gear 9 keyed to a drive shaft 10, Figure 2, supported in journal bearings 11 and 12 of the main frame casting 3. Fixed to the opposite ends of drive shaft 10 are pinions 13 and 14 constituting the sun gears of planetary trains generally indicated at 15 and 16.

The planetary mechanisms 15 and 16 are identical and unit 15 is shown in detail in Figures 3 and 4 to which reference will now be made, in addition to Figure 2.

A drum 17 is mounted for free rotation on a bushing concentric with main drive shaft 10 and has keyed thereto an internal ring gear 18 journalled on a bushing concentric with a driven shaft 19, which is coaxial with shaft 10. A sleeve 20 keyed to shaft 19 is provided with a radial flange 21 carrying a plurality of stud shafts 22 on which are rotatably mounted pinions 23 meshing with the teeth of pinion 13 and ring gear 18.

Half circle bands 24 and 25 encircle drum 17 and each is provided at one end with a lug 26 or 27 connected by means of pins 28 and 29 to a supporting lug 30 mounted on a pin 31 supported by a casting 32 bolted to the main frame casting 3, this mounting preventing rotation of the bands with the drum. To the other end of band 25 is fixed a lug 33 to which is pivotally connected one end of a lever 34 by means of a pin 35, lever 34 being of twin arm form, as may be most clearly seen in Figure 1, with one arm positioned at each side of lug 33.

To the other end of band 24 is fixed a lug 36 to which is pivoted, by means of a pin 37, a threaded socket member 38 in which is engaged the threaded end of a screw 39, whose other headed end is supported on a yoke 40 pivotally mounted between the arms of lever 34 adjacent pin 35.

A roller 41 is supported between the free ends of lever 34 and rests on the upper plane face of a piston 42 reciprocable in a cylinder 43, the piston and cylinder constituting a band operating jack. To the medial portion of lever 34 is pivotally secured by means of a pin 44, a rod 45 influenced by a compression spring 46 to hold roller 41 against the end of piston 42. It will be obvious from the described linkage that elements 45 and 46 constitute release means for bands 24 and 25, yieldably opposing oscillation of lever 34 due to movement of piston 42 (which engages roller 41) outwardly of cylinder 43 when hydraulic pressure is admitted to the latter.

In case of failure of the hydraulic mechanism, manual means are provided for the tightening of bands 24 and 25. A pair of triangular plates 47 and 48, Figures 3 and 4, are pierced at one pair of their registering apices to receive a bolt 49 extending between a pair of ears, one of which is shown at 50, Figure 3, fixed to the casting in which cylinder 43 is formed. At another pair of their apices, plates 47 and 48 carry a roller 51 engaged under lever 34, while at their remaining pair of apices the plates have pivoted thereto, through a pin 52, a link 53. At its other end, link 53 is connected through a pin 54 with an arm 55 fixed to a hollow rock shaft 56 to the outer end of which, at the control side of the machine is fixed a hand lever 57, Figure 3a. By moving the lever to rock shaft 56 in a clockwise direction, plates 47 and 48 are rocked in a counter-clock-wise direction to cause the roller 51 to abut behind lever 34 and swing the latter so that the brake bands are tensioned. It will be noted that piston 42 and roller 41 are merely in abutting engagement with lever 34 so that actuation of one of them leaves the other entirely unaffected.

A rock shaft 67 has rigidly secured thereto an arm similar to arm 55 of Figure 4 connected with means to effect the manual operation of the bands associated with planetary gearing 16, shaft 67 being disposed within hollow shaft 56. Shaft 67 projects beyond the outer end of shaft 56 and has fixed thereto an operating lever 66, Figure 3a. It will be understood that gearing 16 is provided with hydraulic operating means identical with those described with reference to gearing 15.

Shaft 19, Figure 2, has cut in its outer end the teeth of a pinion 58 meshing with a spur gear 59 fixed to the hub of a sprocket 60 which is mounted on a stud shaft 61 fixed to the outer wall of member 1, the sprocket engaging an endless tractor chain 62 to drive the latter. From Figure 1 it will be seen that left hand chain 62 is adapted to be trained over an idler sprocket 63, the lower run of the chain being supported on rollers 64 and 65. As a matter of convenience, the sprocket drive elements at each side of shaft 19 have been given the same reference numerals in Figure 2.

From the above description it will be seen that I have provided a chassis specifically in the form of an endless tread tractor maneuverable in any direction through the proper manipulation of the manual or hydraulic control means. It will be understood that with the bands of both drums loose, there will be no transmission of power from the motor to the treads. Upon equal application of restraining force to the two drums, the tractor will move forward in a straight line, while differential application of pressure will cause the tractor to turn in the desired direction and at the desired angle.

In addition to the band operating jacks above described, the machine including a pair of jacks 119 and 120, Fig. 1, pivoted to the front end of the tractor, these jacks being provided for the purpose of vertically swinging a forward gathering section of a main conveyor, not shown. A further jack 214 includes a piston 216 connected through rope gearing 229 to a discharge conveyor 188 to swing the latter about a vertical axis. Another pair of jacks 189 and 190, which appear only diagrammatically in Fig. 11 serve to swing an end section of the discharge conveyor about a horizontal axis.

For supplying pressure to the various hydraulic jacks, a pump mechanism 268 which draws from a reservoir or tank, not shown, is mounted on the main frame casting 3 and is connected to the motor 7 through a pinion 269 meshing with bevel gear 9, the pinion being fixed on a shaft on which is also fixed a pinion 270 meshing with a spur gear 271 fixed on the shaft of the pump mechanism.

A valve mechanism for controlling the supply and the distribution of the hydraulic medium to the jacks is shown in detail in Figures 5 to 10. The valve mechanism comprises a base 273 on which is mounted a block 274 provided with a plurality of bores 275, 276, 277 and 278 in which are disposed valve plugs 279, 280, 281 and 282.

An inlet port 283 communicates with bore 275 and a through passage to an outlet port 284 is provided through bores 285, 286, 287 and 288. Substantially oppositely disposed bores 289 and 290 connect bore 275 with supply pipes 291 and 292 and similar bores 293 and 294 connect bore 276 with supply lines 295 and 296, a shut-off valve 297 being provided in the latter.

A bore 298 connects bore 277 with supply pipe 299 and bores 300 and 301 connect bore 278 with supply lines 302 and 303. Base 273 is provided with drain pockets beneath plugs 279, 280 and 281 which lead to a sump 304.

Plugs 279 and 280 may be of identical form and as here shown are provided respectively with forwardly flared through passages 305 and 306, and with longitudinal grooves 307, 308 and 309, 310. Plug 281 is provided with an angular recess 311 and with a longitudinal groove 312.

Plug 282 differs from the remaining plugs in that it is not only revoluble, but is vertically displaceable in bore 278. In its lowermost position, a forwardly flared through passage 313 therein is in the plane of passages 287 and 288, so as to connect the two as shown in Figure 8 and when in this position lateral recesses 314 and 315 overlie bores 300 and 301 so that the latter are in communication with outlet 284 over the top of wall 316. Recesses 314 and 315 have downward extensions in the form of grooves 314' and 315' which, as here shown, extend to the bottom of plug 282. In an intermediate axially displaced position of plug 282, an angular recess 317 therein is adapted to connect passage 287 with bores 300 and 301, Figure 10. In the uppermost position of plug 282, a through passage 318 therein, Figure 9, connects passages 287 and 288, imperforate walls of the plug overlying and blocking bores 300 and 301.

The stem of plug 279 which is passed through suitable packing means is provided with an operating handle 319 having a limited oscillatory movement between abutments 320 and 321, Figure 5. The stem of plug 280 is provided with an operating handle 322 having integral with its attachment boss, a rectangularly extending arm 323 whose oscillatory movements are limited by abutments 324 and 325. The control handle 326 for plug 281 is similarly provided with an arm 327 whose movements are limited by abutments 328 and 329.

A bracket 330 fixed to the valve body 274 has an angular portion 331 overlying bore 278 and provided with a coaxial aperture through which the stem 282' of plug 282 passes. A flanged pivot member 332 is secured to the outer face of support 331 with its flanges overlying the margins of a recess formed in a plate 333, the latter thus being adapted for rotary movement about stem 282' as an axis, but being restrained against axial displacement relative to the stem. The upper end of stem 282' is secured to a block 334 pivoted between the bifurcated ends 335 and 336 of a lever 337, the forward ends of arms 335 and 336 being provided with a longitudinally extending slot 338, Figure 7, in which is engaged a pin 339 supported between stanchions 340 and 341 fixed on plate 333. Movement of lever 337 in horizontal planes thus acts to rotate plug 282, while movement of the lever in vertical planes causes it to pivot about pin 339 to reciprocate plug 282 and selectively bring passage 313, recess 317 or passage 318 thereof into register with passage 287 of the valve body. Pivot member 332 is provided with shoulders 342 and 343 adapted to cooperate with shoulders 344 and 345 of plate 333 to limit the swinging movement of lever 337 in horizontal planes.

Referring to Figure 11, pump mechanism 268 has its delivery port in connection with inlet 283 of the valve body by means of a pipe 346, the outlet of the valve body being in connection with the pump mechanism by means of a return line 347. Sump 304 is in connection with the fluid reservoir by means of a return line 348. Pipe 291 leads to one end of cylinder 214 while pipe 292 leads to the other end of the cylinder. Pipe 295 leads through a branch line 349 to the lower ends of cylinders 119 and 120, while pipe 296 through shut-off valve 297, an escape valve 350 and a branch line 351, leads to the upper ends of cylinders 119 and 120. Pipe 302 leads to the lower end of cylinder 43 associated with planetary gearing 15, while a bleeder pipe 352 leads from this cylinder back to the reservoir. Pipe 303 is in connection with the lower end of cylinder 43 associated with planetary gearing 16 and a bleeder pipe 353 leads from this cylinder back to the reservoir.

With the parts of the valve mechanism in the position shown in Figures 7 and 8, the hydraulic medium, ordinary oil, will merely be circulated through the valve block, entering through line 346 and returning through line 347. If now, handle 319 be moved in a clock-wise direction, inlet 283 will be placed in connection with bore 289, groove 308 will be placed in connection with bore 290, and the rear end of passage 305 will be blocked by an imperforate wall portion of bore 275. Under these circumstances, fluid will pass through line 291 to the forward end of cylinder 214 moving piston 215 rearwardly and thus swinging the delivery conveyor 186. The fluid to the rear of the piston will be exhausted through line 292, bore 290 and groove 308 to sump 304, whence it will return through line 348 to the reservoir. It will be obvious that movement of lever 319 in a counter-clockwise direction will cause a reverse supply and exhaust of the fluid as regards cylinder 214.

Similarly, upon rotation of plug 280 in a clock-wise direction (handle 319 having been returned to its central position) fluid will be supplied through lines 295 and 349 to the lower ends of cylinders 119 and 120 to elevate the gathering end of the main conveyor, fluid being exhausted from the upper ends of the cylinders through lines 351 and 296.

Under some circumstances, the gathering end of the conveyor will be sufficiently heavy so it will not tend to climb the material and thus may be entirely controlled by the supply of fluid to and its exhaust from the lower ends only of cylinders 119 and 120. Under these circumstances, lines 296 and 351 may be drained, valve 297 closed, and valve 350 opened so that pressures developed in the upper ends of cylinders 119 and 120 will be relieved. Under these conditions, when line 295 is being drained through groove 309 of plug 280, through passage 306 will be blocked due to the fact that its rear end will be closed by an imperforate wall of bore 276. Since thus there will be no escape for the fluid supplied by the pump mechanism, the latter is provided with a relief valve in the well known manner.

Upon rotation of plug 281 in clockwise direction the fluid supply will be connected through line 299 and branch line 354 to the lower end of cylinders 189 and 190 to elevate the rear end of the delivery conveyor, which lowers by gravity when the plug is turned in a counter-clockwise direction to bring groove 312 in register with bore 298. It will be evident that if desired, this plug and bore combination may be substituted in the position of bore 276 and plug 280 if it is desired to do away with the connection to the upper ends of cylinders 119 and 120.

With plug 282 in the position shown in Figures 7 and 8, the hydraulic medium is passing freely through passage 313 and lines 302 and 303 are draining through recesses 314 and 315. Upon a clockwise rotation of plug 282, the pressure fluid is admitted to line 302 to tension to the desired extent the control bands of planetary gearing 15 through the movement of piston 42 in cylinder 43. Rotation of the plug in a counter-clockwise direction connects the fluid supply to cylinder 43 associated with planetary gearing 16. If plug 282 is lifted to the intermediate position shown in Figure 10, fluid is supplied to both of cylinders 43. When the plug is in its upper limit position, shown in Figure 9, the fluid supply freely traverses the plug through passage 318 while the side walls of the plug block bores 300 and 301 and lock the fluid in lines 302 and 303, thus retaining the planetary bands in their adjusted position.

In the position of plug 282 shown in Figure 10, pressure is supplied to both of lines 302 and 303 so that the transmission bands are simultaneously operated. By turning the plug in either direction, one or the other of grooves 314' and 315' is brought over port 300 or 301 so that fluid escape from one of the lines is permitted through the groove while pressure is maintained in the other line. With the plug in the position shown in Figure 9, both ports 300 and 301 are completely blocked. However, if the plug is rotated in one direction or the other, one of the ports may be maintained blocked and one or the other of grooves 314' and 315' brought into communication with the other port so that fluid escape through the latter is permitted.

With plug 282 in the position shown in Figure 8, it may be turned, for example, in counter-clockwise direction a certain angular extent while still maintaining exhaust through groove or recess 314. If the plug is now lifted to the position of Figure 10, the plug body will still cover port 300, whereas port 301 is in communication with passage 287. This operation may be reversed for sole supply through port 300. In this manner the plug may be moved directly to its intermediate position from its lower position to supply pressure directly to one or the other of the jacks without passing through an intermediate position wherein pressure is supplied to both of the jacks as would be the case if the plug were lifted prior to its being turned.

It will be understood that while a specific embodiment of the invention has been shown and described, the invention is by no means limited to details of the disclosure and its scope is determined in the following claims.

We claim:

1. In a machine of the class described comprising a pair of traction elements, and steering mechanism comprising a drum and cooperating band associated with each traction element, the combination of separate hydraulically actuatable means for operating said bands, a source of fluid under forced pressure, and a valve for effecting alternate or simultaneous supply of the hydraulic medium to said band operating means or for blocking the supply to said band operating means simultaneously, said valve comprising a casing and a plug rotatable and axially reciprocable in said casing, the blocking position of the valve being reached by axial displacement of the plug from its supply position.

2. In a machine of the class described comprising a pair of traction elements, and steering mechanism comprising a drum and cooperating band associated with each traction element, the combination of separate hydraulically actuatable means for operating said bands, a source of hydraulic pressure, and a valve for effecting alternate or simultaneous supply of the hydraulic medium to said band operating means, said valve including a housing having a pair of opposed ports of which one constitutes a waste port and the other an inlet port in connection with the source, said casing having a second pair of opposed ports interposed between the first pair of ports, and a conduit connecting each of said second pair of ports with one of said hydraulically actuatable means, and a rotatable plug in said casing, said plug being provided with a through opening and lateral recesses adapted in one angular position of the plug to respectively connect the first-mentioned pair of casing ports and to connect said second ports with said waste port, said through opening having a flared portion adapted in other angular positions of the plug to connect either one of said second pair of ports with said inlet port, the one of said second ports not so connected being in exhaust relation with one of said lateral recesses.

3. In a machine of the class described comprising a pair of traction elements, and steering mechanism comprising a drum and cooperating band associated with each traction element, the combination of separate hydraulically actuatable means for operating said bands, a source of hydraulic pressure, and a valve for effecting alternate or simultaneous supply of the hydraulic medium to said band operating means, said valve including a housing having a pair of opposed ports of which one constitutes a waste port and the other an inlet port in connection with the source, said casing having a second pair of opposed ports interposed between the first pair of ports, and a conduit connecting each of said second pair of ports with one of said hydraulically actuatable means, and a rotatable and axially displaceable plug in said casing, said plug being provided with a through opening and lateral recesses adapted in one angular position of the plug to respectively connect the first-mentioned pair of casing ports and to connect said second ports with said waste port, said through opening having a flared portion adapted in other angular positions of the plug to connect either one of said second pair of ports with said inlet port, the one of said second ports not so connected being in exhaust relation with one of said lateral recesses, said plug having a transverse groove adapted in an axially displaced position of the plug to simultaneously connect said second pair of ports with the inlet port.

4. In a machine of the class described comprising a pair of traction elements, and steering mechanism comprising a drum and cooperating band associated with each traction element, the combination of separate hydraulically actuatable means for operating said bands, a source of hydraulic pressure, and a valve for effecting alternate or simultaneous supply of the hydraulic medium to said band operating means, said valve including a housing having a pair of opposed ports of which one constitutes a waste port and the other an inlet port in connection with the source, said casing having a second pair of opposed ports interposed between the first pair of ports and a conduit connecting each of said second pair of ports with one of said hydraulically actuatable means, and a rotatable and axially displaceable plug in said casing, said plug being provided with a through opening and lateral recesses adapted in one angular position of the plug to respectively connect the first-mentioned pair of casing ports and to connect said second ports with said waste port, said through opening having a flared portion adapted in other angular positions of the plug to connect either one of said second pair of ports with said inlet port, the one of said second ports not so connected being in exhaust relation with one of said lateral recesses, said plug having a transverse groove adapted in an axially displaced position of the plug to simultaneously connect said second pair of ports with the inlet port and a second through opening adapted in another axially displaced position of the plug to connect the first-mentioned pair of ports while the body of the plug blocks said second pair of ports.

5. In a machine of the class described comprising a pair of traction elements, and steering mechanism comprising a drum and cooperating band associated with each traction element, the combination of separate hydraulically actuatable means for operating said bands, a source of fluid constantly under forced pressure, and valve means for effecting alternate or simultaneous supply of the hydraulic medium to said band operating means or for diverting the supply and preventing escape of the medium from one or both of said band operating means upon interruption of supply thereto.

6. In a machine of the class described comprising a pair of traction elements, and steering mechanism comprising a drum and cooperating band associated with each traction element, the combination of separate hydraulically actuatable means for operating said bands, a source of fluid constantly under forced pressure, and valve means for effecting simultaneous supply of the hydraulic medium to said band operating means or for diverting the supply and preventing escape of the medium from one or both of said band operating means upon interruption of supply thereto.

7. In a machine of the class described comprising a pair of traction elements, and steering mechanism comprising a drum and cooperating band associated with each traction element, the combination of separate hydraulically actuatable means for operating said bands, a source of hydraulic pressure, a valve comprising a casing and a plug, a conduit connecting the source and an inlet opening in the valve casing, conduits connecting said hydraulically actuatable means respectively with outlet ports in said casing, said plug being adjustable to simultaneously close the outlet ports to maintain fluid pressure in said band operating means and said plug being longitudinally displaceable to admit fluid simultaneously to said outlet ports.

8. In a machine of the class described comprising a pair of traction elements, and steering mechanism comprising a drum and cooperating band associated with each traction element, the combination of separate hydraulically actuatable means for operating said bands, a source of hydraulic pressure, a valve comprising a casing and a plug, a conduit connecting the source and an inlet opening in the valve casing, conduits connecting said hydraulically actuatable means respectively with outlet ports in said casing, said plug being operable to simultaneously admit fluid from the casing inlet to both outlets and longitudinally displaceable to cut off supply to said outlet ports and to permit the conduits connected thereto to exhaust therethrough.

9. In a machine of the class described, comprising a pair of traction elements, and steering mechanism comprising a drum and cooperating band associated with each traction element, the combination of separate hydraulically actuatable means for operating said bands, a source of hydraulic fluid under forced pressure; a single valve means having an inlet for said fluid, an escape opening, and a pair of outlet ports; and conduits connecting said outlet ports with said hydraulically actuatable means respectively, said valve means comprising a movable control member adjustable to effect simultaneous supply through said ports or to cut off the supply through one of said ports while maintaining the supply through the other of said ports.

10. In a machine of the class described, comprising a pair of traction elements, and steering mechanism comprising a drum and cooperating band associated with each traction element, the combination of separate hydraulically actuatable means for operating said bands, a source of hydraulic fluid under forced pressure; a single valve means having an inlet for said fluid, an escape opening, and a pair of outlet ports; and conduits connecting said outlet ports with said hydraulically actuatable means respectively, said valve means comprising a movable control member adjustable to effect simultaneous supply through said ports or to cut off the supply through one of said ports while maintaining the supply through the other of said ports, said control member being also adjustable to block both of said ports to hold fluid in said conduits.

11. In a machine of the class described, comprising a pair of traction elements, and steering mechanism comprising a drum and cooperating band associated with each traction element, the combination of separate hydraulically actuatable means for operating said bands, a source of hydraulic fluid under forced pressure; a single valve means having an inlet for said fluid, an escape opening, and a pair of outlet ports; and conduits connecting said outlet ports with said hydraulically actuatable means respectively, said valve means comprising a movable control member adjustable to effect simultaneous supply through said ports or to cut off the supply through one of said ports while maintaining the supply through the other of said ports, said control member being also adjustable to cut off the supply through both of said ports and to effect fluid escape from either one of said conduits.

12. In a machine of the class described comprising a pair of traction elements and steering mechanism comprising a drum and cooperating band associated with each traction element, the combination of separate hydraulically actuatable means for operating said bands, a source of hydraulic fluid under pressure, a valve including a casing and a rotary plug in said casing, said plug having a transverse groove, an inlet port and a pair of outlet ports in said casing in the plane of said groove, a conduit connecting said source of pressure and said inlet port, conduits connecting said outlet ports and said hydraulically actuatable means, respectively, the disposition of said ports relative to said groove being such that in the normal position of the plug the inlet port is in connection with said outlet ports through said groove, an exhaust port in said casing, said plug having exhaust provisions so arranged that upon rotation of the plug in either direction one of said outlet ports is placed in connection with said exhaust port while the other outlet port is maintained in connection with said inlet port.

13. In a machine of the class described comprising a pair of traction elements and steering mechanism comprising a drum and cooperating band associated with each traction element, the combination of separate hydraulically actuatable means for operating said bands, a source of hydraulic fluid under pressure, a valve including a casing and a rotary plug in said casing, said plug having a transverse groove, an inlet port and a pair of outlet ports in said casing in the plane of said groove, a conduit connecting said source of pressure and said inlet port, conduits connecting said outlet ports and said hydraulically actuatable means, respectively, the disposition of said ports relative to said groove being such that in the normal position of the plug the inlet port is in connection with said outlet ports through said groove, an exhaust port in said casing, said plug having a pair of axially extending grooves so arranged that upon rotation of the plug in either direction one of said outlet ports is placed in connection with said exhaust port through one of said last named grooves while the other outlet port is maintained in connection with said inlet port.

14. In a machine of the class described comprising a pair of traction elements and steering mechanism comprising a drum and cooperating band associated with each traction element, the combination of separate hydraulically actuatable means for operating said bands, a source of hydraulic fluid under pressure, a valve including a casing and a rotary and axially reciprocable plug in said casing, said plug having a transverse groove, an inlet port and a pair of outlet ports in said casing in the plane of said groove, a conduit connecting said source of pressure and said inlet port, conduits connecting said outlet ports and said hydraulically actuatable means, respectively, the disposition of said ports relative to said groove being such that in the normal position of the plug, the inlet port is in connection with said outlet ports through said groove, an exhaust port in said casing, said plug having exhaust provisions so arranged that upon rotation of the plug in either direction one of said outlet ports is placed in connection with said exhaust port while the other outlet port is maintained in connection with said inlet port, axial displacement of said plug bringing solid surfaces thereof in blocking relation to said outlet ports.

15. In a machine of the class described comprising a pair of traction elements and steering mechanism comprising a drum and cooperating band associated with each traction element, the combination of separate hydraulically actuatable means for operating said bands, a source of hydraulic fluid under pressure, a valve including a casing and a rotary and axially reciprocable plug in said casing, said plug having a transverse groove, an inlet port and a pair of outlet ports in said casing in the plane of said groove, a conduit connecting said source of pressure and said inlet port, conduits connecting said outlet ports and said hydraulically actuatable means, respectively, the disposition of said ports relative to said groove being such that in the normal position of the plug, the inlet port is in connection with said outlet ports through said groove, an exhaust port in said casing, said plug having exhaust provisions so arranged that upon rotation of the plug in either direction one of said outlet ports is placed in connection with said exhaust port while the other outlet port is maintained in connection with said inlet port, axial displacement of said plug bringing solid surfaces thereof in blocking relation to said outlet ports and simultaneously bringing a through opening in the plug into position to connect said inlet port and said exhaust port.

16. In a machine of the class described comprising a pair of traction elements and steering mechanism comprising a drum and cooperating band associated with each traction element, the combination of separate hydraulically actuatable means for operating said bands, a source of hydraulic fluid under pressure, a valve including a casing and a rotary and axially reciprocable plug in said casing, said plug having a transverse groove, an inlet port and a pair of outlet ports in said casing in the plane of said groove, a conduit connecting said source of pressure and said inlet port, conduits connecting said outlet ports and said hydraulically actuatable means, respectively, the disposition of said ports relative to said groove being such that in the normal position of the plug, the inlet port is in connection with said outlet ports through said groove, an exhaust port in said casing, said plug having a pair of axially extending grooves so arranged that upon rotation of the plug in either direction one of said outlet ports is placed in connection with said exhaust port through one of said last named grooves while the other outlet port is maintained in connection with said inlet port, axial displacement of said plug bringing said grooves into register with said outlet ports to permit the latter to exhaust simultaneously.

17. In a machine of the class described comprising a pair of traction elements and steering mechanism comprising a drum and cooperating band associated with each traction element, the combination of separate hydraulically actuatable means for operating said bands, a source of hydraulic fluid under pressure, a valve including a casing and a rotary and axially reciprocable plug in said casing, said plug having a transverse groove, an inlet port and a pair of outlet ports in said casing in the plane of said groove, a conduit connecting said source of pressure and said inlet port, conduits connecting said outlet ports and said hydraulically actuatable means, respectively, the disposition of said ports relative to said groove being such that in the normal position of the plug, the inlet port is in connection with said outlet ports through said groove, an exhaust port in said casing, said plug having a pair of axially extending grooves so arranged that upon rotation of the plug in either direction one of said outlet ports is placed in connection with said exhaust port through one of said last named grooves while the outlet port is maintained in connection with said inlet port, axial displacement of said plug bringing said grooves into register with said outlet ports to permit the latter to exhaust simultaneously and simultaneously bringing a through opening in the plug into position to connect said inlet port and said exhaust port.

18. In a machine of the class described comprising a pair of traction elements and steering mechanism comprising a drum and cooperating band associated with each traction element, the combination of separate hydraulically actuatable means for operating said bands, a source of hydraulic fluid under pressure, a valve including a casing and a plug rotary and axially reciprocable therein, said casing having an inlet port and outlet ports in the same transverse plane of the plug and also having an exhaust opening, said plug having exhaust provisions which, in one axial position of the plug, connect both of said inlet ports with said exhaust opening, said plug having a transverse groove adapted to connect the inlet and outlet ports in another axial position of the plug, the plug upon being turned to a certain angular extent in the first mentioned position being directly axially displaceable to the second mentioned axial position to connect said inlet port and one only of said outlet ports through said transverse groove, a conduit connecting said source and said inlet port, and conduits connecting said outlet ports and said hydraulically actuatable means, respectively.

NILS D. LEVIN.
EDWARD G. LEWIS.